US009523415B2

(12) United States Patent
Schauerte et al.

(10) Patent No.: US 9,523,415 B2
(45) Date of Patent: Dec. 20, 2016

(54) BELT TENSIONING DEVICE FOR A BELT DRIVE AND APPARATUS WITH A BELT TENSIONING DEVICE

(75) Inventors: Stefan Schauerte, Attendorn (DE); Joachim Jud, Daaden (DE); Simon Pfeifer, Plettenberg (DE); Manfred Jung, Westerburg (DE)

(73) Assignee: Muhr und Bender KG, Attendorn (DE)

( * ) Notice: Subject to any disclaimer, the term of this patent is extended or adjusted under 35 U.S.C. 154(b) by 267 days.

(21) Appl. No.: 13/614,466

(22) Filed: Sep. 13, 2012

(65) Prior Publication Data
US 2013/0079185 A1    Mar. 28, 2013

(30) Foreign Application Priority Data

Sep. 22, 2011  (DE) .......................... 10 2011 053 869

(51) Int. Cl.
*F16H 7/12* (2006.01)
*F16H 7/08* (2006.01)

(52) U.S. Cl.
CPC ....... *F16H 7/1281* (2013.01); *F16H 2007/081* (2013.01); *F16H 2007/0893* (2013.01)

(58) Field of Classification Search
CPC ............... F16H 7/08; F16H 7/10; F16H 7/12; F16H 7/1254; F16H 7/1281; F16H 2007/081; F16H 2007/0889; F16H 2007/0893; F16H 2007/0897
USPC ................. 474/113, 117, 118, 133, 134, 135
See application file for complete search history.

(56) References Cited

U.S. PATENT DOCUMENTS

| 4,758,208 | A | 7/1988 | Bartos et al. |
| 6,648,783 | B1* | 11/2003 | Bogner ......................... 474/134 |
| 2006/0079360 | A1 | 4/2006 | Jung et al. |
| 2009/0298631 | A1 | 12/2009 | Jud et al. |
| 2010/0144473 | A1 | 6/2010 | Ward et al. |

FOREIGN PATENT DOCUMENTS

| CA | 2229943 C | 8/2002 |
| DE | 508156 C | 9/1930 |

(Continued)

OTHER PUBLICATIONS

"Torsion Springs", Handbook of Spring Design, 2002, SMI, pp. 1-4.
(Continued)

*Primary Examiner* — Sang Kim
*Assistant Examiner* — Juan Campos, Jr.
(74) *Attorney, Agent, or Firm* — Bejin Bienerman PLC

(57) ABSTRACT

A belt tensioning device for a belt drive having at least one apparatus with a housing, a driveshaft and a belt pulley, as well as an infinite belt for driving the belt pulley. The belt tensioning device includes a base that can be or is firmly connected to the apparatus, exactly one tensioning arm that, relative to the base, is supported so as to be pivotable around a pivot axis and that, via a torsion spring, is supported in the circumferential direction against the base. The belt tensioning device also includes a tensioning roller that, at the tensioning arm, is supported so as to be rotatable around an axis of rotation and serves to tension the belt. When the belt tensioning device is mounted at the apparatus, the pivot axis of the tensioning arm is arranged inside the outer diameter of the belt pulley of the apparatus.

13 Claims, 5 Drawing Sheets

(56) References Cited

FOREIGN PATENT DOCUMENTS

| | | |
|---|---|---|
| DE | 19631507 A1 | 2/1998 |
| DE | 19926615 A1 | 6/1999 |
| JP | 3028551 A | 2/1991 |
| JP | 2006170435 A * | 6/2006 |

OTHER PUBLICATIONS

European Search Report, Application No. EP 12180562.6, dated Jun. 30, 2014.
German Search Report for Application No. 10 2011 053 869.0 dated Apr. 25, 2012.
European Examination Report, Application No. EP12180562.6 dated Oct. 17, 2013.

\* cited by examiner

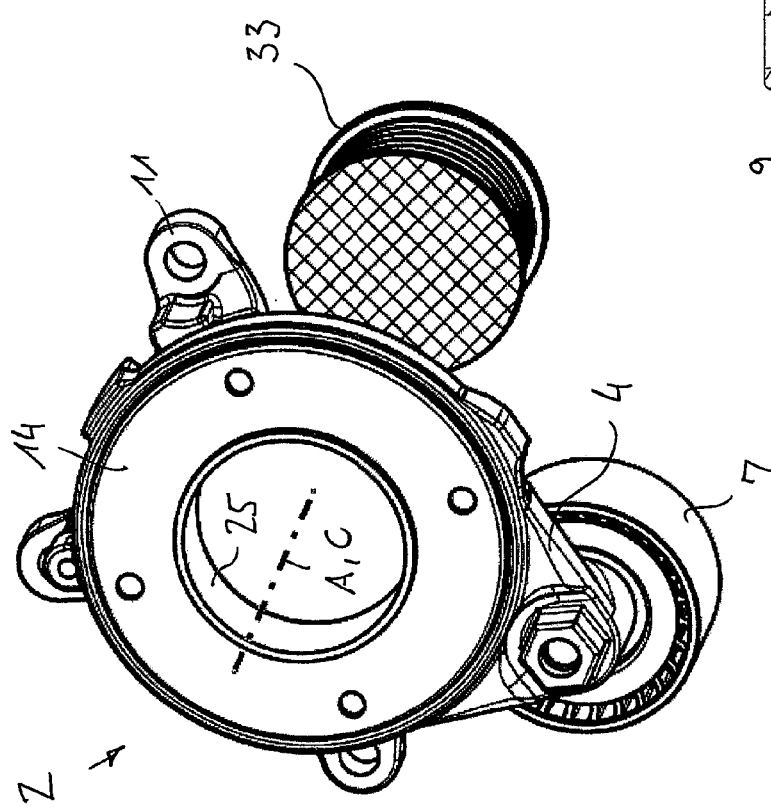
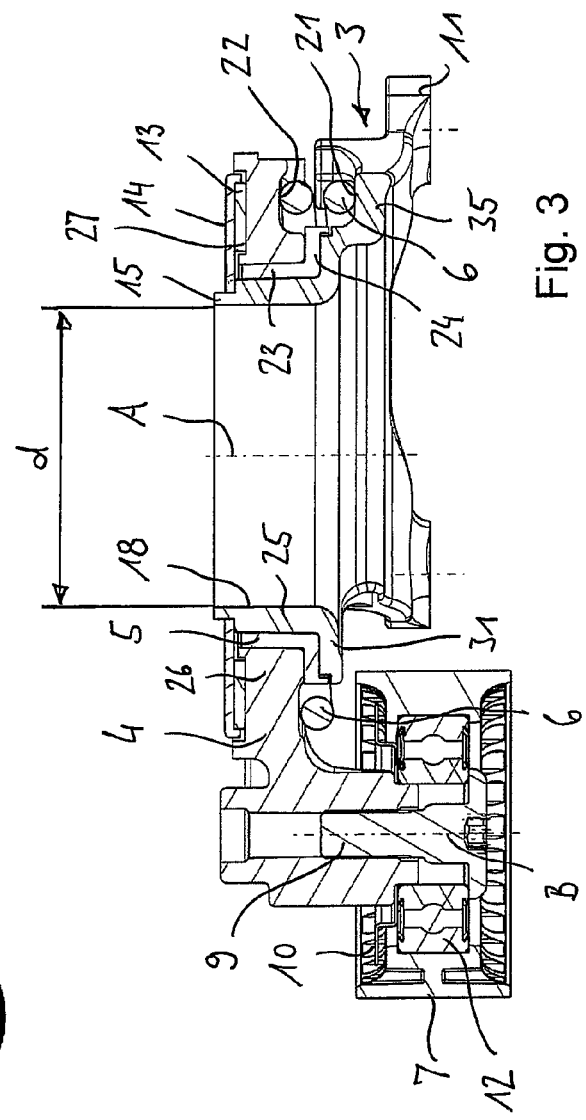
Fig. 2
Fig. 3

BELT TENSIONING DEVICE FOR A BELT DRIVE AND APPARATUS WITH A BELT TENSIONING DEVICE

BACKGROUND OF THE INVENTION

The invention relates to a belt tensioning device for a belt drive which comprises an infinite belt and at least two belt pulleys of which one can function as an input and one as an output. Such belt drives are used more particularly in connection with internal combustion engines of motor vehicles for driving auxiliary apparatuses or accessories, wherein a first belt pulley is positioned on the crankshaft of the internal combustion engine and drives the belt. Further, belt pulleys are associated with the auxiliary apparatuses, such as a water pump, a generator, or an air conditioning compressor and are rotatingly driven by the belt. In conventional belt drives, the auxiliary apparatuses are designed as consumers, i.e., they are driven by the belt pulley of the crankshaft via the belt. A slack side of the belt is formed between the crankshaft and the apparatus adjoining the crankshaft in the direction of circulation of the belt, the adjoining apparatus typically being a generator. In order to ensure that the belt is sufficiently wrapped around the belt pulley, the belt is pretensioned by a tensioning roller of the belt tensioning device.

There are also prior art belt drives which comprise an auxiliary apparatus in the form of a starter generator, i.e., an electric motor which, depending on the operating condition, can be operated as a starter or as a generator. Under normal or engine operating conditions, the belt pulley at the crankshaft is the driving pulley, whereas the starter generator as well as the remaining apparatuses are driven. Under starter operating conditions, the starter generator drives the crankshaft via the associated belt pulley in order to start the internal combustion engine. In such belt drives having a starter generator as an auxiliary apparatus, between the engine operation on the one hand and the starter operation on the other hand, a change takes place between the driving side of the belt and the slack side of the belt on both sides of the belt pulley of the starter generator. It is therefore necessary to provide spring-loaded tensioning rollers for both sides, of which spring-loaded tensioning rollers one is effective under spring load at the slack side of the belt, whereas the other one is pushed back from the tensioned driving side of the belt.

From EP 0 858 563, there is known a tensioning device with a fixed tensioning arm axle. The tensioning arm axle is provided with a supporting flange, which is meant to contact an engine block. On one end of the tensioning arm axle, a tensioning arm is rotatably supported by means of a conical friction bearing. A coaxially arranged helical torsion spring is clamped in between the supporting flange and a support fixed at the tensioning arm, for the purpose of applying an axial pressure force and a torsional force.

Document DE 10 2004 047 422 A1 proposes a belt tensioning device with a receiving housing having a hub coaxially arranged therein and a tensioning arm. The receiving housing and the hub are rotatably supported relative to one another with pre-tension by means of a helical torsion spring. There is provided a damping device which comprises a circumferentially slotted damping bush and a band spring adapted to the damping bush.

From EP 2 128 489 A2, there is known a belt tensioning device for a belt drive with a starter generator. The belt tensioning device comprises a housing in which two tensioning arms are pivotably supported around a joint pivot axis. The tensioning arms are supported relative to one another by spring means. With the driving belt pulley mounted at the starter generator, the housing can be mounted contact-free relative to the starter generator in an annular region surrounding the driveshaft of the starter generator.

U.S. Pat. No. 4,758,208 proposes a belt tensioning device for a belt drive with a starter generator. The housing of the starter generator is fixed at the engine block such that the housing is rotatable to a limited extent around the axis of rotation of the driving pulley. The belt tensioning device comprises two tensioning arms which, scissor-like, are pivotable relative to one another around the driveshaft. Between the tensioning arms, there is arranged a tensioning spring that loads the two tensioning arms towards one another.

It is an object of the present invention to propose a belt tensioning device for a belt drive, which belt tensioning device is compact in design and independent of the construction and space conditions of the main drive. Furthermore, an object consists in proposing an apparatus with such a belt tensioning device that requires only a small amount of space.

SUMMARY OF THE INVENTION

The object is achieved by providing a belt tensioning device for a belt drive, wherein the belt drive has at least one apparatus with a housing, a driveshaft, and a belt pulley, as well as an infinite belt for driving the belt pulley, the belt tensioning device comprising a base which is firmly connected or connectable to the apparatus; exactly one tensioning arm which is pivotably supported relative to the base around a pivot axis (A) and which, via a torsion spring, is supported in the circumferential direction against the base; as well as a tensioning roller which is rotatably supported around an axis of rotation (B) at the tensioning arm and serves to tighten the belt; wherein the belt tensioning device is designed such that, in a condition in which the belt tensioning device is mounted at the apparatus, the pivot axis (A) of the tensioning arm is arranged inside the outer diameter of the belt pulley of the apparatus.

In principle, the apparatus can be any machine which forms part of the belt drive, i.e., more particularly any of the auxiliary units or accessories driven by the main engine of the motor vehicle. To that extent, the apparatus can also be referred to as a working machine. More particularly, it is proposed that the apparatus is provided in the form of a generator to which the belt tensioning device can be firmly connectable or is firmly connected. However, it is understood that the inventive belt tensioning device can also be provided at any other auxiliary apparatus of the belt drive, such as a water pump, hydraulic pump, or compressor. "Firmly connectable" refers to an embodiment wherein the belt tensioning device is provided as a separate unit and is subsequently connected to the apparatus, for example via a threaded connection. "Firmly connected" refers to an embodiment wherein the belt tensioning device is firmly connected to the apparatus and, more particularly, forms one unit with the apparatus. The connection of the belt tensioning device can be put into effect, for example, on a front plate of the apparatus or on an adjoining apparatus. The belt tensioning device is preferably mounted directly on the apparatus or a component of the apparatus.

Because the belt tensioning device can be mounted directly on the apparatus, a compact design is achieved in an advantageous way. More particularly, the belt tensioning device can be arranged at the end face of the apparatus so that there is no need for providing a separate installation space between the crankshaft and the apparatus. In addition, there is no need for any further connecting means for the belt tensioning device at the engine block. Overall, the belt tensioning device can be designed independently of the packaging and the space requirements of the engine. Because the pivot axis of the tensioning arm is arranged inside the outer diameter of the belt pulley, the belt tensioning device, in an axial view, is positioned inside an envelope of the apparatus so that the radial installation space is small.

According to a preferred embodiment, the base is designed such that, in the mounted condition of the belt tensioning device on the apparatus, the pivot axis of the tensioning arm is arranged inside the outer diameter of the driveshaft, more particularly coaxially relative to the axis of rotation of the driveshaft. This results in a particularly compact design.

The tensioning arm is supported relative to the base by means of a torsion spring in the direction of rotation, with the torsion spring loading the tensioning arm towards the belt so as to tension same. It is particularly advantageous for an axially compact design if the helical spring comprises a maximum of three full windings, more particularly, a maximum of two full windings, preferably between one and two windings. Relative to the nominal diameter, the axial length of the helical spring is small, i.e., the nominal diameter of the helical spring is relatively large. To achieve a flat construction, it is particularly advantageous if, in the mounted condition of the helical spring, the ratio of the nominal diameter of the helical spring relative to the axial length of the helical spring is greater than 3.0, more particularly greater than 4.0, preferably greater than 5.0. It is thus possible for the belt tensioning device to be attached to the end face of the apparatus without claiming additional space in the surroundings of the apparatus between the crankshaft and the apparatus. In a preferred embodiment, the ratio of the nominal diameter of the helical spring relative to the axial length of the helical spring, in the mounted condition, is smaller than 9.0, more particularly smaller than 8.0, or preferably smaller than 7.0. For calculating the size ratios of the helical spring, any of the lower limits can be combined with any of the upper limits. It is understood that the ratio between the nominal diameter and the axial length of the helical spring also depends on the wire diameter of the spring wire. The greater the wire diameter, the stiffer the spring, i.e., the smaller can be the axial length, respectively the diameter of the helical spring, and vice versa.

According to a first possibility, the belt tensioning device is designed such that the bearing for the tensioning arm at the base, if viewed from the apparatus, is located behind the belt plane. This means that at least one central plane of the bearing is arranged so as to be axially offset towards the engine chamber relative to a central plane of the belt. This embodiment is particularly suitable for a belt tensioning device that constitutes a separate unit which is subsequently connected to the apparatus via suitable fixing means, for example, by a bolt-flange connection. According to a preferred embodiment, the fixing means are provided by flange portions of the base, which point radially outwardly from the annular housing. The fixing means are preferably positioned in a circumferential region, which is located at least approximately opposite the tensioning arm and the driving belt leading away from the belt pulley. To ensure that the belt tensioning device is reliably fixed at the apparatus it is advantageous if the fixing means, in an axial view of the belt pulley, extend over a circumferential portion in excess of 90° and less than 270°, more particularly of approximately 150° to 210°.

According to a second possibility, the belt tensioning device is designed such that the bearing for the tensioning arm at the base is positioned in the region between the housing and the belt pulley of the apparatus. This means that a central plane of the bearing is arranged between the apparatus and the central plane of the belt. This also applies to the torsion spring, which tensions the tensioning arm relative to the base and which is also positioned between the central plane of the belt and the apparatus. This embodiment is particularly suitable for a belt tensioning device which is produced so as to be integral with the apparatus, i.e., which has a single-piece design with the apparatus. According to a preferred embodiment, the base of the belt tensioning device and the housing of the apparatus can be produced in one piece. In this way, the number of components is kept small, the production and mounting procedures are simplified, and there is achieved a particularly compact construction.

According to a preferred embodiment which applies to both possibilities, the base comprises a supporting face which axially supports the torsion spring, with the supporting face at least partially axially overlapping the driveshaft in a mounted condition. This means that the plane generated by the supporting face intersects the driveshaft. The supporting face of the base is preferably ramp-shaped, with the gradient in the circumferential direction being adapted to the gradient of the helical spring. The torsion spring is preferably fitted with axial pretension between the tensioning arm and the base. A first end of the torsion spring is axially and circumferentially supported at the base. The second end of the torsion spring is axially and circumferential supported at the tensioning arm. The supporting face of the tensioning arm, which supporting face serves to provide axial support for the torsion spring, is preferably ramp-shaped in the circumferential direction, with the gradient of the supporting face being adapted to the gradient of the helical spring.

More particularly, it is proposed that the base comprises an outer bearing face, which is preferably cylindrical and on which the bearing for supporting the tensioning arm is arranged. The torsion spring is preferably arranged coaxially around the bearing, with the torsion spring and the bearing at least partially axially overlapping one another. This leads to the belt tensioning device having a short axial size. According to a preferred further embodiment, the bearing, if viewed in half a longitudinal section, is L-shaped and comprises a flange-shaped portion for axially supporting the tensioning arm, and a sleeve-shaped portion for radially supporting the tensioning arm relative to the base. For example, the bearing can be provided in the form of a friction or sliding bearing, for instance, made of plastics or any other low-friction material such as bronze. The use of a rolling-contact bearing is also conceivable. In an axial direction away from the base, the tensioning arm is axially supported relative to the base by means of an axial bearing. For effectively supporting the axial forces acting between the torsion spring and the tensioning arm, it is advantageous if the axial bearing at least partially radially overlaps relative to the torsion spring. For instance, the axial bearing can be supported on an axial disc which is firmly connected to the base.

According to a preferred embodiment, the base comprises an aperture into which the driveshaft of the apparatus at least partially extends into in a mounted condition. This means that at least a partial portion of the driveshaft axially overlaps with the base wall surrounding the aperture. This embodiment contributes to an axially short construction. In an advantageous further embodiment, the aperture is provided in the form of a through-aperture, by means of which the mounting procedure of the belt pulley on the driveshaft and, respectively, the mounting procedure of the belt tensioning device on the apparatus, are simplified. The through-aperture of the base has an internal diameter that is preferably greater than the outer diameter of the driveshaft, more particularly greater than the outer diameter of the belt pulley. This embodiment ensures that the belt tensioning device and, respectively, the tensioning arm can be easily and comfortably attached to the apparatus. The belt tensioning device and, respectively, the tensioning arm are placed on to the apparatus, with the driveshaft of the apparatus entering the through-aperture of the base and of the tensioning arm, respectively. This design is particularly suitable for the second possibility, wherein the bearing for the belt tensioning device is arranged between the apparatus and the belt, comprising a particularly compact construction because the base and the housing form one part. However, the construction with the through-aperture in the tensioning arm is also suitable for the first possibility. If the inner diameter of the through-aperture is greater than the outer diameter of the belt pulley, the belt tensioning device can easily be mounted in a condition in which the belt pulley has already been mounted.

Furthermore, the objective of the invention is achieved by providing an apparatus arrangement for a belt drive comprising an apparatus with a housing, a driveshaft, and a belt pulley, as well as a belt tensioning device according to one or several of the above-mentioned embodiments, wherein the base of the belt tensioning device is firmly connected to the housing of the apparatus. In this way, there are achieved the above-mentioned advantages of a compact design, independently of the space conditions inside the engine compartment, so that, in this connection, reference is made to the above embodiments. The apparatus is preferably a generator, but it can also be any one of the auxiliary apparatuses, accessories or working machines driven by the main drive, such as a pump or compressor. The arrangement comprises the apparatus and the belt tensioning device connected thereto. To that extent, it can also be referred to as an "apparatus-belt-tensioning arrangement."

As described above, the belt tensioning device and the apparatus according to a first possibility can be provided in the form of separate units that are subsequently connected to one another by suitable connecting means, for example, by threaded connecting means. Alternatively, the belt tensioning device and the apparatus can together be provided in the form of one unit. From the point of view of construction, it is advantageous if the base of the belt tensioning device is provided so as to be integral with the housing of the generator.

Various aspects of this invention will become apparent to those skilled in the art from the following detailed description of the preferred embodiments, when read in light of the accompanying drawings.

BRIEF DESCRIPTION OF THE DRAWINGS

FIG. 2 shows the belt tensioning device according to FIG. 1 in a perspective view with a driving belt pulley.

FIG. 3 shows the belt tensioning device according to FIG. 1 in a longitudinal section.

DETAILED DESCRIPTION OF THE PREFERRED EMBODIMENTS

Figure 1:
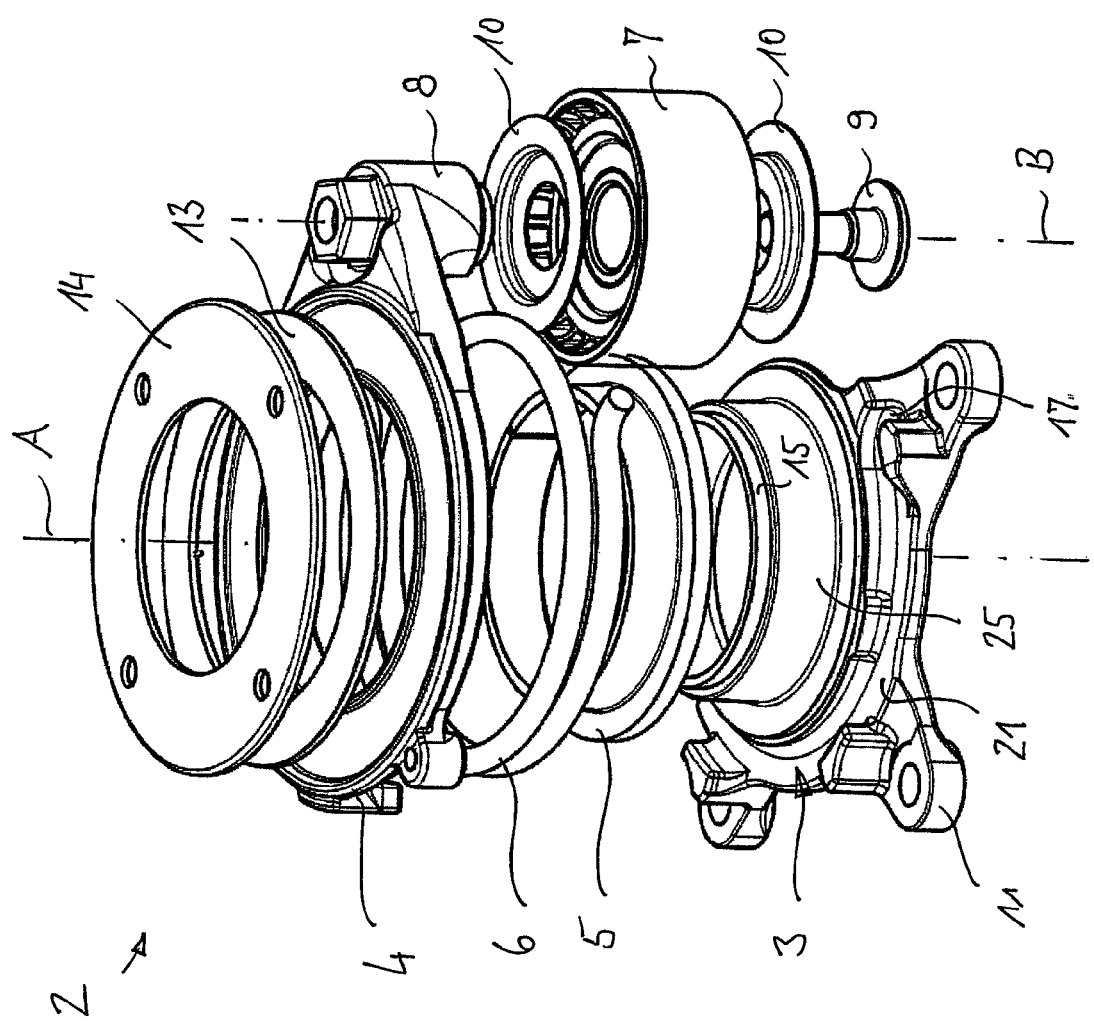
FIG. 1 shows an inventive belt tensioning device in a first embodiment in an exploded view.

FIGS. 1 to 3, which will be described jointly below, show an inventive belt tensioning device 2 in a first embodiment. The belt tensioning device 2 comprises a base 3, which can be fixed to an auxiliary apparatus of an engine or to a part connected to the apparatus and a tensioning arm 4 that, by means of a bearing 5, is supported relative to the base 3 so as to be pivotable around a pivot axis A and that, via a torsion spring 6, is circumferentially supported relative to the base 3. The engine can be of any kind, such as an internal combustion engine or an electric motor for driving a vehicle. For fixing the base 3, it comprises three radially outwardly projecting flange portions 11 with boreholes through which bolts can be inserted for being fixed to the apparatus 28.

At a free end portion, the tensioning arm 4 carries a tensioning roller 7, which is rotatable around an axis of rotation B extending parallel to the pivot axis A. The tensioning roller 7 is rotatably supported at a bearing journal 8 of the tensioning arm 4 and secured thereto by a bolt 9. Furthermore, two discs 10 axially adjoin the tensioning roller 7 and protect the bearing 12 from any penetrating dirt. The tensioning arm 4 is axially supported on an axial disc 14 via a stop disc 13, which forms an axial bearing for the tensioning arm 4. The axial disc 14 is firmly connected to the base 3. In the present embodiment, this is achieved by beading a collar 15 of the base 3 after the torsion spring 6, the bearing 5, the tensioning arm 4, the stop disc 13, and the axial disc 14 have been mounted on the base 3. The tensioning arm 4 is positioned at least approximately in the same plane as the bearing 5 so that the required axial installation space is small.

The torsion spring 6 is provided in the form of a helical spring. A first end 16 of the helical spring 6 is bent radially outwardly and is circumferentially supported on a respective contact face 17 of the base 3. The helical spring 6 generates a pretension of the tensioning arm 4 relative to the base 3 so that the belt of the belt drive is tensioned.

The helical spring 6 is arranged coaxially outside the bearing 5 for the tensioning arm 4, with the helical spring 6, and the bearing 5 axially covering one another at least partially in order to keep the installation space in the axial direction as small as possible. In FIG. 1 particularly, it can be seen that the helical spring 6 comprises a relatively large diameter relative to the axial length. The number of windings is greater than one and smaller than two. The circumferential extension of the helical spring 6 ranges between 540° and 690°. In the mounted condition of the helical spring 6 in which the helical spring is axially pre-tensioned, the ratio of the nominal diameter of the helical spring relative to the axial length ranges between 3.0 and 9.0, more particularly between 5.0 and 8.0. It is understood that the values are not meant to be restrictive. Within the ranges all intermediate ranges are conceivable. In principle, depending on installation space conditions, it is also possible to use values that are greater than 9.0, as a result of which the spring, relative to its diameter, would be very short in the axial direction.

Furthermore, it is understood that the ratio of the spring diameter to the axial length in the mounted condition, inter alia, also depends on the diameter of the spring wire. The greater the wire diameter, the shorter the axial length of the helical spring can be.

Furthermore, it can be seen that the belt tensioning device 2 and the base 3, respectively, comprise a through-aperture 18 that extends coaxially relative to the longitudinal axis A. In this way, the base 3 can easily be bolted to the apparatus 28, and one end of the driveshaft can optionally be introduced into the through-aperture 18 or extend into same. Overall, it is thus possible to achieve a short assembly. The inner diameter d of the through-aperture 18 is greater than the outer diameter of the driveshaft 19. In the present embodiment, the inner diameter "d" approximately corresponds to the diameter of the belt pulley 33, and it is understood that the diameter can also be greater or smaller than the outer diameter of the belt pulley. The base 3 comprises a sleeve portion 25 for receiving the bearing 5 which sleeve portion 25, towards the fixing means 11, is followed by a first stepped portion 31 for axially supporting the bearing 5, as well as a second stepped portion 35. The second stepped portion 35 which, relative to the first stepped portion 31, is positioned on a greater diameter, comprises the supporting face 21 for the torsion spring 6 and carries the fixing means 11.

The helical spring 6 is inserted with axial pre-tension between a supporting face 21 of the base 3 and a supporting face 22 of the tensioning arm 4. In this way, the tensioning arm 4 is axially loaded against the disc 14 so that no undesirable noise is generated. The supporting face 21 extends over a circumferential portion of the base 3. At least one partial portion of the supporting face 21 is positioned in a plane which overlaps with the driveshaft. The supporting face 21 of the base 3 has the shape of a ramp in the circumferential direction, which is adapted to the gradient of the helical spring 6. This also applies to the supporting face of the tensioning arm 4 against which the helical spring 6 is axially supported by means of its opposed end portion.

In the present embodiment, the belt tensioning device 2 is designed and arranged such that, if viewed from the apparatus 28, the bearing 5 of the tensioning arm 4 at the base 3 is positioned behind the belt plane. The belt plane is defined as the plane which, in the mounted condition, is formed by the belt center. If viewed in half a longitudinal section, the bearing 5 is L-shaped and comprises a sleeve-shaped portion and an adjoining, radially outwardly projecting flange portion. The bearing 5 is slid on to corresponding sleeve portion 25 of the base 23. The sleeve-shaped portion 23 provides radial support, whereas the flange portion 24 provides axial support. The tensioning arm 4 is slid onto the bearing 5 by means of an annular bearing portion 26. On its side facing away from the base 3, the tensioning arm 4 comprises an annular recess 27 that serves to receive the stop disc 13. The stop disc 13, in turn, is supported against the axial supporting 14 and, to that extent, acts as an axial bearing. The material for the bearing is preferably low-friction plastics, with other types of bearing not being excluded.

Figure 4:
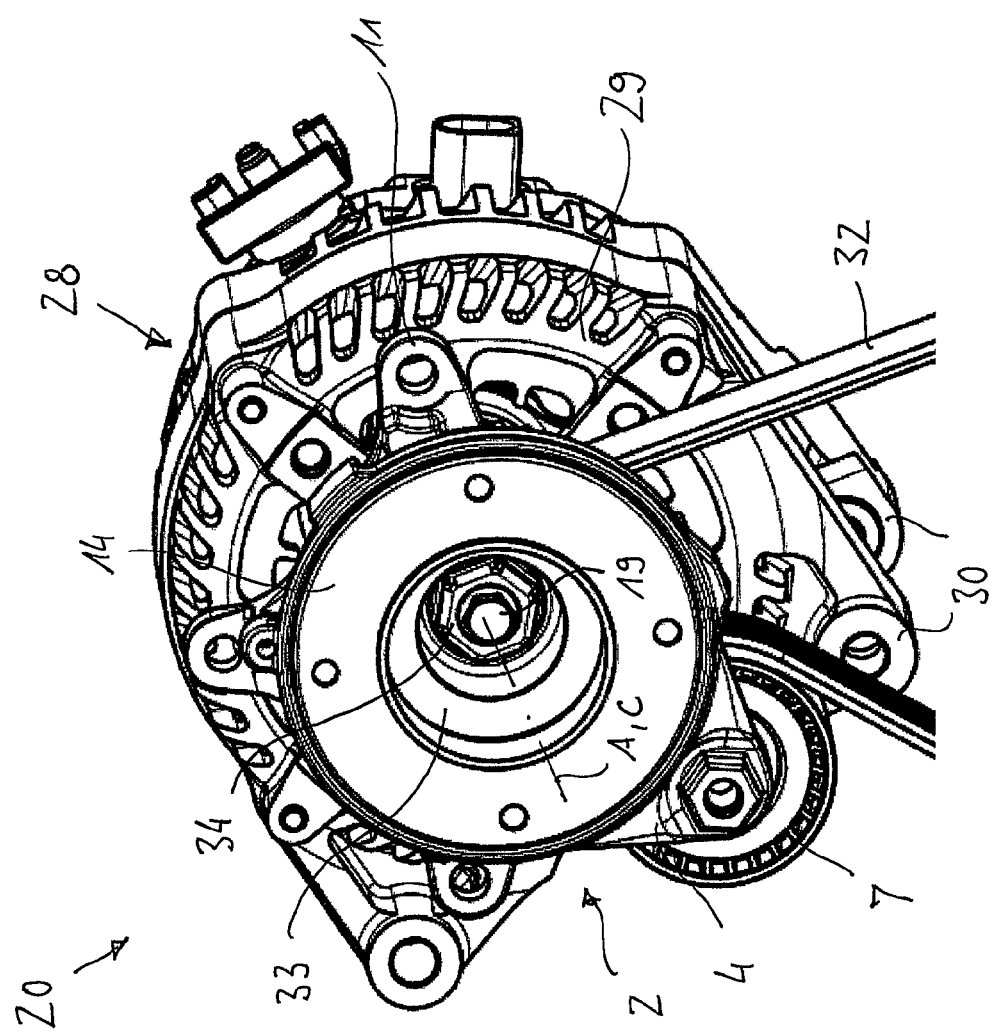
FIG. 4 shows an inventive arrangement with an inventive belt tensioning device according to FIG. 1 in a perspective view.

FIG. 4 shows die inventive belt tensioning device 2 according to FIGS. 1 to 3 in the condition as mounted on an apparatus 28. The belt tensioning device 2 and the apparatus 28 jointly form the apparatus arrangement 20. In the present embodiment, the apparatus 28 is provided in the form of a generator. It is possible to see the housing 29 of the generator, which housing 29 can be attached via fixing means 30 to an engine block. However, it is understood that the apparatus can also be any other working machine that forms part of the belt drive, for instance, an auxiliary apparatus or system such as a pump or a compressor.

The belt tensioning device 2 is attached to an end face of the generator 28. This is effected via the circumferentially distributed connecting flanges 11 into which bolts can be inserted for being threaded to the housing 29 of the generator 28. Furthermore, it is possible to see the infinite belt 32 and the belt pulley 33 which, by means of a threaded connection 34, is connected in a rotationally fixed way on the driveshaft 19 of the generator 28.

The base 3, respectively the belt tensioning device 2, is designed such that, in the condition when the belt tensioning device 2 is mounted on the apparatus 28, the pivot axis A of the tensioning arm 4 is arranged inside the outer diameter of the driveshaft 19, preferably at least approximately coaxially relative to the axis of rotation C of the drive. This embodiment ensures a particularly compact construction, the belt tensioning device 2 being easily connectable to the generator 28.

Figure 5:
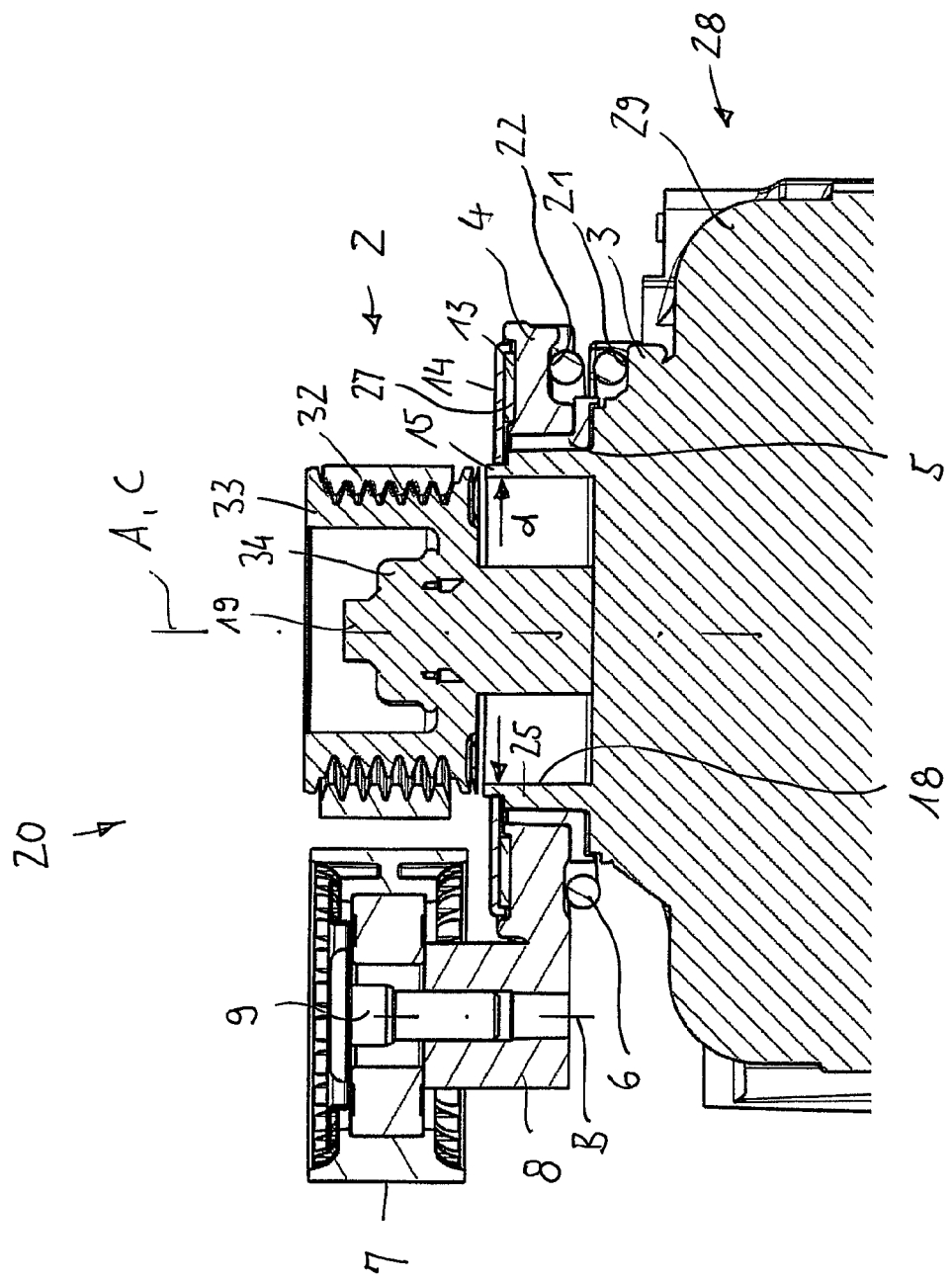
FIG. 5 shows an inventive arrangement with an inventive belt tensioning device in a second embodiment in a perspective view.
Figure 6:
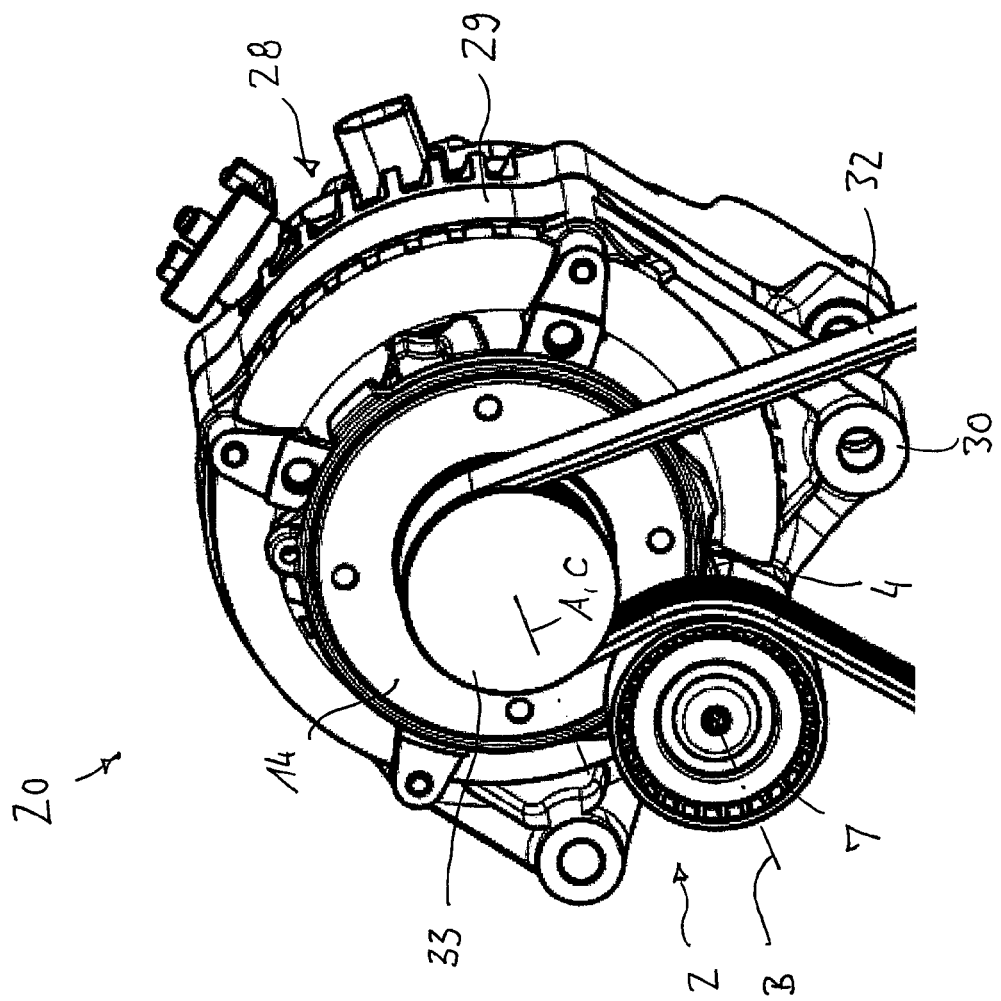
FIG. 6 shows the arrangement according to FIG. 5 in a longitudinal section.

FIGS. 5 and 6 show an inventive belt tensioning device 2 and an inventive apparatus arrangement 20 in a second embodiment. These embodiments largely correspond to those of FIGS. 1 to 4 so that, as far as the common features are concerned, reference is made to the above description. Identical or modified parts have been given the same reference numbers as in FIGS. 1 to 4. Below, there will follow a description mainly of the differences between the embodiments.

One special feature of the present embodiment consists in that the bearing 5 of the belt tensioning device 2 is arranged axially between the apparatus 28 and the belt pulley 33. The bearing journal 8 for the tensioning roller 7 points away from the apparatus 28. It can also be seen that the base 3 of the belt tensioning device 2 is produced so as to be integral, more particularly so as to form one piece with the housing 29 of the apparatus 28. In an advantageous way, this leads to a reduction in the number of components required. Furthermore, the belt tensioning device 2 and the apparatus 28 can be pre-mounted as one unit. The driveshaft 19 of the apparatus 28 is guided through the through-aperture 18 of the base 3 and, at its free end, carries the belt pulley 33 that holds the belt 32. For fixing the belt pulley 33, there is provided a nut 34 that is threaded onto the driveshaft 19.

By means of its first end, the torsion spring 6 is axially and circumferentially supported relative to the base 3 and the housing 29, respectively, and at is opposite end, it is axially and circumferentially supported relative to the tensioning arm 4. Overall, the present embodiment comprises a reduced number of components, and the production and assembly procedures are simplified so that, overall, there is achieved a compact design which is independent of the space conditions in the engine compartment.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A one-armed belt tensioning device for use with a belt drive, the belt tensioning device comprising:
   a base which is connectable to an apparatus of the belt drive,
   one and only one tensioning arm which is pivotably supported relative to the base around a pivot axis,
   a torsion spring provided in the form of a helical spring, the helical spring having a first end circumferentially supported against the base and a second end circumferentially supported against the tensioning arm, and a tensioning roller which is rotatably supported at the tensioning arm around an axis of rotation and is adapted to tighten a belt of the belt drive, wherein the belt tensioning device is adapted to be mounted on the apparatus of the belt drive such that a pivot axis of the tensioning arm is arranged inside an outer diameter of a belt pulley of the apparatus, wherein the torsion spring is a helical spring which includes less than 2.0 full windings, and wherein a ratio of a nominal diameter of the helical spring relative to an axial length of the helical spring, in a mounted condition, is greater than 4.0.

2. A belt tensioning device according to claim 1, wherein the base is designed such that, in the mounted condition, the pivot axis of the tensioning arm is adapted to be arranged coaxially relative to a rotational axis of a driveshaft of the apparatus.

3. A belt tensioning device according to claim 2, wherein the base comprises an aperture into which the driveshaft or the belt pulley of the apparatus, in a mounted condition, is adapted to at least partially extend into.

4. A belt tensioning device according to claim 1, wherein the ratio of the nominal diameter of the helical spring relative to the axial length of the helical spring, in the mounted condition is greater than 5.0.

5. A belt tensioning device according to claim 1, wherein the base and the housing are provided in the form of separate components which are connected to one another by connecting means.

6. A belt tensioning device according to claim 1, wherein the base comprises a supporting face which axially supports the torsion spring, wherein the supporting face, at least partially, axially overlaps the belt pulley in a mounted condition.

7. A belt tensioning device according to claim 6, wherein the supporting face of the base comprises at least one ramp-shaped portion.

8. A belt tensioning device according to claim 1, wherein a bearing is provided for supporting the tensioning arm relative to the base, wherein the torsion spring is arranged coaxially around the bearing, and wherein the torsion spring and the bearing at least partially axially overlap.

9. A belt tensioning device according to claim 8, wherein the bearing has an L-shaped cross sectional shape and comprises a flange-shaped portion for axial supporting purposes and comprises a sleeve-shaped portion for radial supporting purposes.

10. A belt tensioning device according to claim 1, wherein in an axial direction away from the base, the tensioning arm is axially supported relative to the base by means of an axial bearing, wherein the axial bearing, at least partially, radially overlaps the torsion spring.

11. An apparatus arrangement for a belt drive comprising:
an apparatus with a housing, a driveshaft and a belt pulley; and
a one-armed belt tensioning device according to claim 1, wherein the base of the one-armed belt tensioning device is firmly connected or firmly connectable to the housing of the apparatus.

12. An apparatus arrangement according to claim 11, wherein the base of the one-armed belt tensioning device is made in one piece with the housing of the apparatus.

13. An apparatus arrangement according to claim 11, wherein the apparatus is a generator.

* * * * *